United States Patent
Faraldi et al.

(10) Patent No.: US 10,098,354 B2
(45) Date of Patent: Oct. 16, 2018

(54) METHOD OF ESTIMATING A HUMIDITY LEVEL IN A STEAM COOKING CHAMBER OF A STEAM COOKING APPLIANCE, METHOD OR OPERATING THE STEAM COOKING APPLIANCE AND STEAM COOKING APPLIANCE

(71) Applicant: Electrolux Appliances Aktiebolag, Stockholm (SE)

(72) Inventors: Paolo Faraldi, Forli (IT); Riccardo Furlanetto, Pordenone (IT); Lorenzo Gattei, Forli (IT); Michele Pellis, Trieste (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 14/901,940

(22) PCT Filed: Jun. 26, 2014

(86) PCT No.: PCT/EP2014/063465
§ 371 (c)(1),
(2) Date: Dec. 29, 2015

(87) PCT Pub. No.: WO2015/024689
PCT Pub. Date: Feb. 26, 2015

(65) Prior Publication Data
US 2016/0374353 A1 Dec. 29, 2016

(30) Foreign Application Priority Data
Aug. 19, 2013 (EP) .................... 13180811

(51) Int. Cl.
*A21B 3/04* (2006.01)
*F24C 15/00* (2006.01)
(Continued)

(52) U.S. Cl.
CPC .................... *A21B 3/04* (2013.01); *A23L 5/13* (2016.08); *A47J 27/04* (2013.01); *F24C 15/003* (2013.01);
(Continued)

(58) Field of Classification Search
CPC . A21B 3/04; A23L 5/13; F24C 15/327; F24C 15/003; A47J 27/04; A47J 2027/043
(Continued)

(56) References Cited

U.S. PATENT DOCUMENTS 4,066,399 A * 1/1978 Gunther .................. A61L 2/206
261/78.2
4,722,321 A * 2/1988 Meister .................... A21B 3/04
126/20
(Continued)

FOREIGN PATENT DOCUMENTS

DE 4206845 A1 9/1993
DE 102008024021 A1 12/2009
(Continued)

OTHER PUBLICATIONS

Machine Translation of DE102008024021, Aug. 22, 2017, 22 pages.
(Continued)

*Primary Examiner* — Drew E Becker
(74) *Attorney, Agent, or Firm* — Pearne & Gordon LLP

(57) ABSTRACT

The present application in particular is related to a method of estimating a humidity level in a steam cooking chamber (4) of a steam cooking appliance (1). The method comprises successively measuring static or quasi-static pressure values $(P_1, \ldots, P_n)$ prevailing within the steam cooking chamber (4); successively calculating from the pressure values $(P_1, \ldots, P_n)$; and setting and using the humidity index value $(EH_1, EH_n)$ as an actual measure for the humidity level.

15 Claims, 3 Drawing Sheets

(51) Int. Cl.
*F24C 15/32* (2006.01)
*A23L 5/10* (2016.01)
*A47J 27/04* (2006.01)

(52) U.S. Cl.
CPC ........ *F24C 15/327* (2013.01); *A23V 2002/00* (2013.01); *A47J 2027/043* (2013.01)

(58) Field of Classification Search
USPC .... 426/523, 231–233, 510–511; 99/325–333
See application file for complete search history.

(56) References Cited

U.S. PATENT DOCUMENTS

| | | | | |
|---|---|---|---|---|
| 5,048,400 | A * | 9/1991 | Ueda | A47J 27/0802 126/374.1 |
| 5,517,980 | A * | 5/1996 | Cappello | A47J 27/16 126/20 |
| 5,694,835 | A * | 12/1997 | Mangina | A21B 3/04 126/21 A |
| 7,730,759 | B2 * | 6/2010 | Rombach | G01N 25/56 73/1.59 |
| 2003/0167823 | A1 * | 9/2003 | Gruhbaum | A21B 3/04 73/24.04 |
| 2006/0289507 | A1 * | 12/2006 | Corradini | F24C 15/327 219/707 |
| 2011/0185915 | A1 * | 8/2011 | Eades | A47J 27/004 99/331 |
| 2011/0278279 | A1 * | 11/2011 | Giazzon | A21B 3/04 219/400 |
| 2012/0294992 | A1 * | 11/2012 | Sager | F24C 7/08 426/231 |
| 2015/0295258 | A1 * | 10/2015 | Knies | H01M 8/04835 429/413 |

FOREIGN PATENT DOCUMENTS

| | | | |
|---|---|---|---|
| DE | 102010000148 A1 | * | 7/2011 |
| DE | 202013100363 U1 | | 1/2013 |
| EP | 2154435 A2 | | 2/2010 |
| JP | 61280553 A | * | 12/1986 |
| SU | 1777059 A2 | * | 11/1992 |

OTHER PUBLICATIONS

International Search Report for PCT/EP2014/063465, dated Jan. 28, 2015, 2 pages.
Office action issued in corresponding European Patent Application No. 13180811.5 dated Jan. 30, 2017, 2 pages.
European Search Report issued in corresponding European Patent Application No. 13180811.5 dated Feb. 14, 2014, 8 pages.

* cited by examiner

METHOD OF ESTIMATING A HUMIDITY LEVEL IN A STEAM COOKING CHAMBER OF A STEAM COOKING APPLIANCE, METHOD OR OPERATING THE STEAM COOKING APPLIANCE AND STEAM COOKING APPLIANCE

CROSS-REFERENCE TO RELATED APPLICATIONS

This application is a U.S. National Stage entry of PCT/EP2014/063465, filed on Jun. 26, 2014, which claims priority to European Patent Application EP 13180811.5, filed on Aug. 19, 2013.

FIELD

The invention is directed to a steam cooking appliance, a method of operating the steam cooking appliance and, in particular, to a method of estimating or determining a humidity level in a steam cooking chamber of the steam cooking appliance.

BACKGROUND

It is generally known that cooking foodstuff can be carried out according to different methods and under different conditions.

One of the generally known cooking methods is steaming or steam cooking, where steam is generated in or brought into the cooking chamber, and which therein induces respective cooking processes, in particular depending on the temperature, pressure and other parameters within the cooking chamber.

In order to optimize steam cooking performance and/or optimize energy consumption it is helpful or required to control the steam condition within the chamber.

In order to control humidity within steam cooking chambers of steaming ovens, it is for example known from EP 0 701 388 B1 to use a humidity sensor to directly measure humidity within the steam cooking chamber. Albeit such a humidity sensor may be comparatively precise, it is comparatively expensive.

From U.S. Pat. No. 5,517,980 A a method of determining or estimating the humidity within the steam cooking chamber is known in which the temperature or temperature change of air flowing, by the effect of a pressure field of a ventilating fan, through a small bypass between the inner volume and the outside of the steam cooking chamber, is used for estimating the humidity level within the chamber. This possibility probably may be realized in an easy way, however it is considered not that reliable as it greatly depends on the efficiency of the fan.

Therefore, it is an object of the invention to provide a method of estimating or determining the humidity level within a steam cooking chamber of a steam cooking appliance or oven, which method on the one hand may be implemented comparatively simple and cost efficient, and on the other hand is comparatively reliable. Further, under similar considerations, a method of operating a steam cooking appliance, in particular oven, and a steam cooking appliance, in particular oven, shall be provided.

SUMMARY

According to a first aspect, a method of estimating or determining a humidity level in a steam cooking chamber of a steam cooking appliance, such as a steam cooking oven, is proposed. The method in particular comprises several steps which are described below:

In one step static or quasi-static pressure values prevailing within the steam cooking chamber are measured successively. For measuring the pressure values an absolute pressure sensor may be used.

Measuring the pressure values successively shall mean that the pressure values can be measured or determined continuously or that they can be determined in successive timepoints within a certain period of time, in particular during a steam cooking process.

Measuring the static or quasi-static pressure values in particular shall mean that the pressure is measured in locations essentially unaffected by the pressure field of air circulations, generated for example by a ventilation fan, within the chamber. Using the static or quasi-static pressure values may greatly contribute to estimating the humidity level even more precisely.

In another step, in particular successive step, of the proposed method, a humidity index value is calculated from the pressure values or smoothed pressure values measured in the step just described.

Note that the smoothed pressure values may be obtained by pressure acquisition smoothing, in particular by a moving average pressure.

According to the proposed method, the humidity index values are calculated from respective pressure or smoothed pressure values via integration, numerical integration or iterative numerical integration.

Respective calculation calculations can be carried out comparatively simple. Further, the proposed methods have proven comparatively robust, effective and exact for estimating the humidity level in the end. The proposed method has proven to give consistent and robust numbers as compared to reference humidity measurement systems.

In a further step, in particular after calculating a respective humidity index value, the humidity index value is set and used as an actual measure, or measure value, or representative for the humidity level, in particular actually, prevailing within the steam cooking chamber.

Using the respective humidity index value has been shown to be effective in estimating, describing and/or reflecting in a comparative exact and robust manner the humidity level within the steam cooking chamber. Or in other words, the inner absolute pressure is a comparatively effective parameter for estimating the humidity level. The absolute pressure as used by the proposed method, in particular allows comparatively robust inferences regarding the humidity level.

In addition, respective absolute pressure sensors are comparatively cheap, and can be implemented with or to the chamber without extensive adaptations.

Therefore, a comparatively robust, effective but also cost-efficient method of estimating the humidity level in the steam cooking chamber can be provided.

In embodiments, the pressure sensor, via which the pressure values are measured, may be arranged outside the cavity and may be connected with the inner cavity via a communicating pipe.

By arranging the pressure sensor outside the cavity it may be shielded from steam cooking impacts, in particular from high temperatures requested by cooking process. Further, it may be arranged in close proximity to processing and/or control electronics adapted for processing pressure values measured by the pressure sensor and/or for controlling the steam cooking process.

In addition, placing the pressure sensor outside the cavity while connecting it via a comparatively small, in particular narrow, pipe with the chamber interior may have advantages for obtaining static or quasi-static pressure values prevailing within the chamber. Or in other words, pressure fluctuations, generated for example by a ventilating fan, can, at least to a certain degree, averaged out.

Note that the pressure sensor may be connected to the inner volume of the chamber via a comparatively small pipe, wherein the term "small" in this connection shall relate to inner diameters of 3 to 6 mm and a length of 150 to 300 mm. Typically, a metal segment will be placed in the very oven cavity, and the connection with the sensor will be provided by a plastic or silicon flexible pipe.

In embodiments, the pressure sensor may communicate with a zone within the cavity essentially unaffected by forced convection generated in the cavity by a fan, in particular ventilation or convection fan. In respective unaffected zones, static or quasi-static pressure fields or conditions are likely to prevail. Static or quasi-static pressure conditions are of advantage, as under these conditions, humidity induced changes can be detected far more exactly, and in particular regardless of the dynamic pressure field generated by the fan, that in particular may be affected by oven load and possibly drifting over oven ageing.

In embodiments, the pressure values may be measured at successive or consecutive timepoints, and an actual humidity index value may be iteratively calculated from a preceding humidity index value. Successive or consecutive measurements may be conducted at discrete points of time during a steam cooking process. The frequency of measurement may be either fix, or variable and depend on the total measurement time, in particular cooking time.

It shall be noted, that pressure measurement can also be conducted continuously. Albeit such an approach is far more data-intensive it may be advantageous under certain steam cooking conditions.

Iterative calculations of the humidity index, which in particular shall comprise integrative calculations, have been proven to be on the one hand comparatively straightforward, but on the other hand they are comparatively robust in obtaining the resolution required for adequately controlling humidity levels in the steam cooking chamber.

In variants, the successive humidity index values are calculated in a weighted integration, weighted numerical integration or weighted iterative numerical integration. Similar to the comments above, respective calculation methods are comparatively exact, robust and effective with regard to steam cooking humidity levels, in particular steam pressures during steam cooking.

It is preferred that a relaxation factor correction is added, in particular in each iteration or integration step. Respective relaxation factor correction is advantageous for coping with steady state situations.

The relaxation factor, in particular relaxation factor correction may take into account and/or correct average humidity losses due to sealing inefficiencies, in particular by rescaling the integral index. It shall be noted, that controlling humidity inside the cavity via introduction of steam implies a mass transfer into the cavity, and a consequent overpressure exhaust from or out of the cavity, as well as absorption of water due to condensate on food and oven walls. These facts may be accounted for with the relaxation factor correction.

In embodiments, the humidity index values are calculated according to the following formulas or calculation rules:

a. $EH_n = EH_{n-1} + (P_n - P_{n-1}) * K_{up} - EH_{n-1} * K_{relax}$, if $P_n > P_{n-1}$ or b. $EH_n = EH_{n-1} + (P_n - P_{n-1}) * K_{down} - EH_{n-1} * K_{relax}$, if $P_n \leq P_{n-1}$;

wherein $E_{Hn}$ and $EH_{n-1}$ are successive humidity index values.

$P_n$ and $P_{n-1}$ are successive pressure values or successive smoothed pressure values.

$K_{up}$ is a first weighting factor. As can be seen, the first weighting factor is applied on the n-th contribution to the integral value calculation, in case that the derivative of the pressure signal between n-th and n−1-th measurement values is positive, meaning an increase of pressure, interpreted as a release of humidity within the cavity. The range of this constant weighting factor may vary from 1 to 1000 for a domestic oven, and in general has to be calibrated for every specific structure and/or oven design or construction.

$K_{down}$ is a second weighting factor. As can be seen, the second weighting factor is applied on the n-th contribution to the integral value calculation, in case that the derivative of the pressure signal between n-th and n−1-th measurement values is positive, meaning a decrease of pressure, interpreted as a removal of humidity from the cavity. The range of this constant may vary from 1 to 1000 for a domestic oven, and in general has to be calibrated for every specific structure and/or oven design or construction.

$K_{relax}$ is a relaxation factor. By the relaxation factor, the integral value may be corrected as explained further above. The value typically may lie in the range from 0.1 to 0.99, and in general has to be calibrated for every specific structure and/or oven design or construction.

The term "successive" in the above mentioned relationships shall mean that respective values are measured or calculated one after the other, in particular without intermediate values therebetween.

The proposed calculation rues have proven to be effective and reliable in estimating and/or approximating the humidity level prevailing within the steam cooking chamber. Based on the humidity levels derived from the humidity index values, steam cooking processes can be controlled effectively and comparatively exactly.

In variants, the factors $K_{up}$, $K_{down}$, and $K_{relax}$ are calibrated for each, i.e. before each new application, in particular steam cooking process. Calibration of the constants may be achieved by statistic correlation optimization, such as for example quadratic deviation minimization, between reference measurement values and calculated index values in different operative conditions: a calibration setup may be performed to cover a whole range of temperature/humidity conditions.

In embodiments, the pressure sensor may be adapted to measure pressures in the range from up to 30 Pa. Note that the range may depend on the oven characteristics, in particular oven cavity tightness. However, such pressure sensors are easily available and can be successfully applied to the presently required application, i.e. in measuring static or quasi-static pressure values prevailing within a steam cooking chamber of a steam cooking appliance.

In embodiments, the pressure sensor may be a differential pressure sensor adapted to measure a difference pressure between the inside of the cavity and the outside of the cavity.

The advantage of such a differential pressure sensor, in particular a related method of determining the effective pressure based on a differential pressure difference between the inner chamber volume and the outside, is that possible offsets due to changes in cavity tightness may be automatically corrected.

According to a second aspect, a method of operating a steam cooking process in a steam cooking chamber of a steam cooking appliance is proposed. Note that the method according to this aspect essentially corresponds to a method of operating a steam cooking appliance. The proposed method comprises:
a) calculating an actual measure of the humidity level according to a method according to the invention as described further above; and
b) activating or deactivating steam generation, in particular a steam generator of the appliance, in dependence of the actual measure and at least one preset value of the humidity level, i.e. at least one values representative of a respectively desired humidity level.

As noted, calculating the actual measure is conducted in accordance to a method as described above, which in particular means that the measure may correspond to the humidity index value determined or calculated from or on the basis of respective pressure values, as proposed above.

Further, activating and deactivating steam generation may correspond to a process of controlling steam generation, such as for example by a steam generator and the like.

Activation and deactivation of steam generation in particular shall mean that steam generation may be stopped if a preset humidity level or humidity saturation level is reached, and that steam generation may be activated if the actual humidity level falls below a preset humidity level or humidity saturation level.

One major advantage in controlling and/or monitoring the humidity level within the steam cooking chamber is that steam cooking processes may be implemented with a humidity target setting, such as required in recipes. A humidity target setting may also be effective in preventing the generation of excess of steam, thereby avoiding energy waste.

According to a third aspect, a steam cooking appliance is provided. The steam cooking appliance comprises a steam cooking functionality with a steam cooking chamber, a control unit, an absolute pressure sensor and steam generation unit, respectively being coupled to the control unit.

The control unit is adapted to estimate or determine a humidity level according to a method as proposed further above. In particular, the estimation of the humidity level may be based on the pressure-based approach as proposed in connection with the first aspect discussed above and embodiments thereof.

Further, the control unit of the proposed appliance may be adapted to affect steam generation by controlling the steam generation unit in accordance and/or dependence of the estimated humidity level.

In particular, the proposed appliance may be controlled according to the humidity index values which are, according to the methods proposed above, based on the absolute pressure prevailing within the steam cooking chamber. As already stated above, a respective control may be implemented with comparative reduced effort, while at the same time being particularly effective and robust.

In embodiments of the appliance it is provided that the absolute pressure sensor is mounted outside the cavity, wherein the pressure sensor is connected to the inner volume of the cavity by a communicating pipe. Such an implementation in particular has advantages with respect to signal transmission, in particular in obtaining comparatively short signal transmission paths. It shall be noted, that such short signal transmission paths are in particular possible if the pressure sensor is arranged outside the steam cooking chamber and is connected thereto via a small communication pipe, as proposed in embodiments of the present invention.

In a variant it is proposed that the appliance comprises a fan for forced ventilation or convection, and that the communication pipe is connected to or communicates with a section of the cavity volume which is essentially unaffected by the fan, in particular the pressure field generated by the fan. In particular in this configuration, an essentially static or quasi-static pressure field may be presented to the pressure sensor. The pressure reading itself may be substantially affected only by the changes in cavity atmosphere composition. This in general may lead to a better signal for humidity index evaluation. Note that, measured oscillations induced by flow dynamics can be of the same order of magnitude as those related to cavity atmosphere composition changes.

In embodiments it is proposed that the pressure sensor is a differential pressure sensor and that it is adapted to calculate a difference pressure between the inside of the cavity and the outside of the cavity. As to advantages, reference is made to the description further above. In the proposed embodiment, the pressure sensor may have connections both to the inner volume of the steam cooking chamber and to the outside. Both connections in particular may be implemented as communication pipes, in particular small communication pipes. The pipes may have inner diameters of 3 to 6 mm and a length of 150 to 300 mm.

In embodiments it is provided that the pressure sensor is adapted to sense pressures in the range between 0 and 100 Pa, preferably between 0 Pa and 20 Pa. As to advantages, reference is made to the description further above.

In all it should become clear that the underlying objects are readily solved by the invention as proposed herein.

BRIEF DESCRIPTION OF THE DRAWINGS

Preferred embodiments of the invention are now described in connection with the annexed drawings, in which.

DETAILED DESCRIPTION OF PREFERRED EMBODIMENTS

Figure 1:
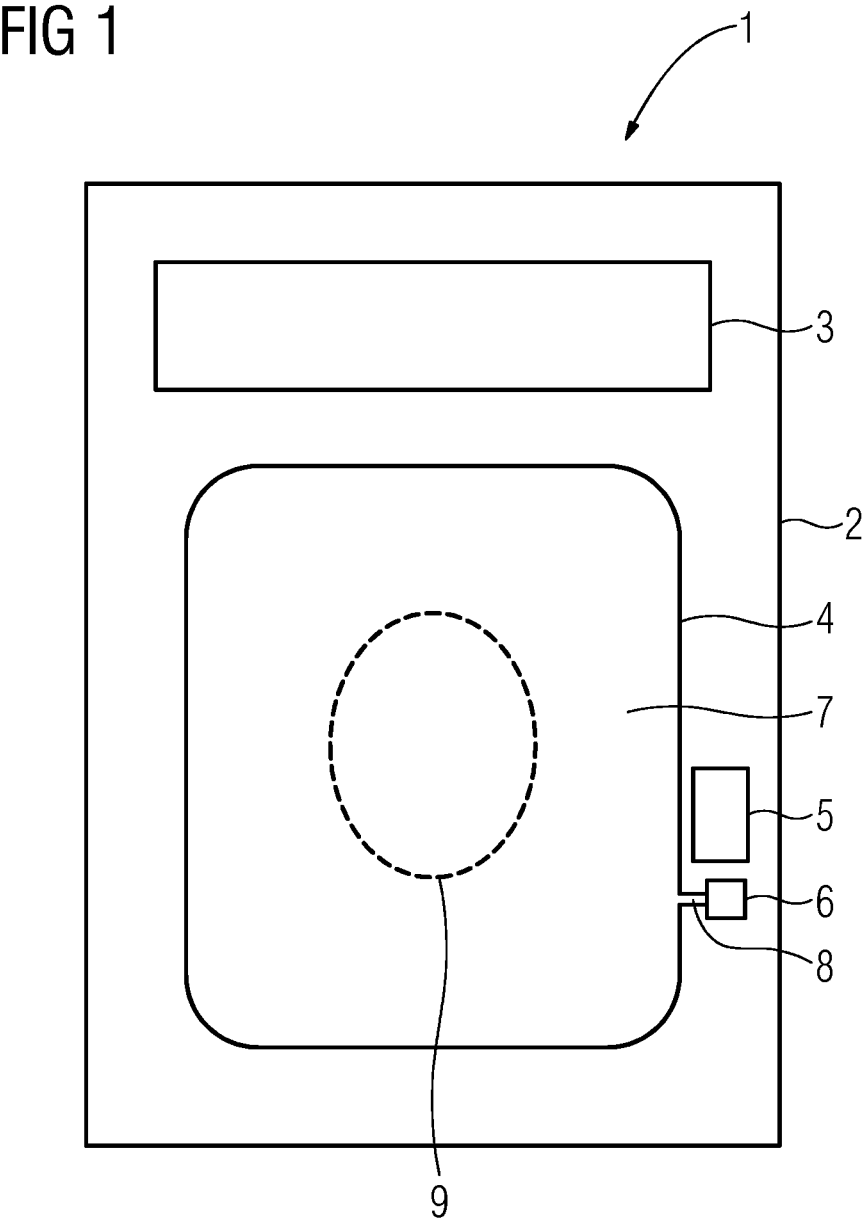
FIG. 1 shows a schematic representation of an appliance with a steam cooking functionality.

FIG. 1 shows a schematic representation of an appliance, in particular steam cooking appliance 1, with a steam cooking functionality.

The steam cooking appliance 1 comprises an outer casing 2 to which a user interface 3 is mounted to, and which accommodates a steam cooking chamber 4 or steam cooking cavity.

The steam cooking chamber 4 in the operating state represents a closed volume, in which steam may be generated, or into which steam may be fed. Steam prevailing within the cooking chamber 4 acts on foodstuff placed in the cooking chamber 4 and causes respective foodstuff to be cooked.

Details of the steam cooking chamber 4, such as a front opening and a door adapted to close the front opening in the operating state, as well as a steam generation unit, have been omitted for a better clarity of the figures.

For steam cooking applications the humidity level prevailing within the stem cooking chamber 4 is one of the major parameters. For this reasons, the steam cooking appliance 1 comprises a steam control unit, which comprises a controller 5 and a pressure sensor 6.

The controller 5 and the pressure sensor 6, which is an absolute pressure sensor, are placed within the outer casing and are arranged in close proximity to one another.

The pressure sensor 6 is connected to the inner volume 7 via a small communicating pipe 8. The communicating pipe 8 may be dimensioned having inner diameters of 3 to 6 mm and a length of 150 to 300 mm. The communicating pipe 8 at least is dimensioned such that the pressure sensor 6 effectively can sense the pressure prevailing within the steam cooking chamber 4.

The communicating pipe 8 is connected to the steam cooking chamber 4 at a location or section of the chamber 4 that is essentially unaffected by a fan 9 provided for circulating air inside the steam cooking chamber 4 during steam cooking operations.

Placing the pressure sensor 6 at respective locations has the advantage that the pressure sensor 6 can measure a quasi-static pressure field essentially free from forced pressure build up and pressure fluctuations induced by the fan 9. The pressure sensor 6 is adapted to measure pressure values in the range from 0 to 30 Pa.

The pressure sensor 6, in particular in connection with the controller 5 may be used to estimate or determine the humidity level prevailing within the steam cooking chamber 4 during a steam cooking process, and to control steam generation or steam partial pressure during the steam cooking process.

Figure 2:
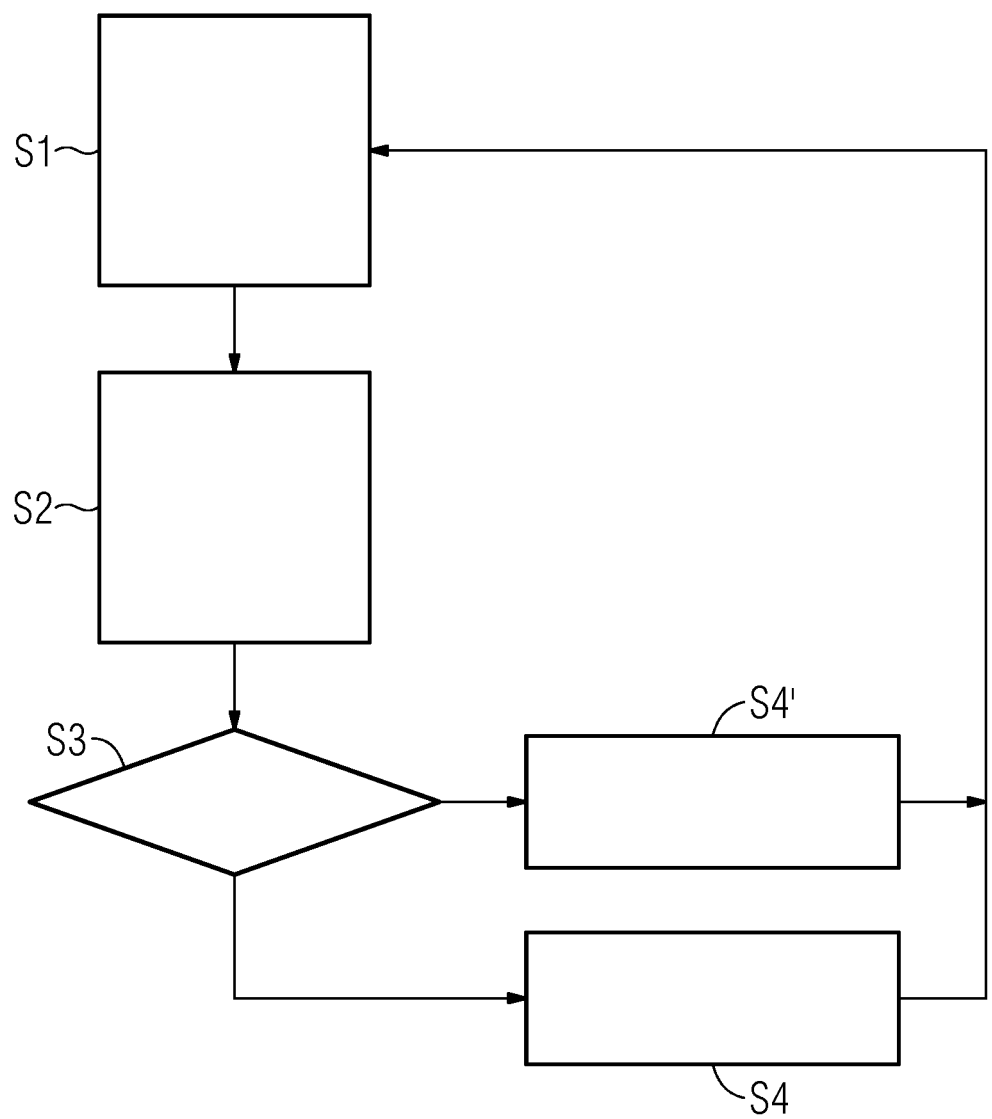
FIG. 2 shows an exemplary sequence diagram of a method for estimating a humidity level within a steam cooking chamber.

Estimating or determining the humidity level prevailing within the steam cooking chamber 4 during a steam cooking process may comprise measurement and calculation steps as represented in FIG. 2. FIG. 2 shows an exemplary sequence diagram for estimating the humidity level within the steam cooking chamber 4.

The method is implemented as an iterative numerical integration, which is based on raw signals of the pressure sensor 6, i.e. pressure values $P_1, \ldots, P_n \ldots$ measured at successive points of time $t_1, \ldots, t_n \ldots$. Determining respective iterative pressure values may be regarded as a first iterative step S1 of the method.

In a second step S2 pressure acquisition smoothing may be conducted: a convenient approach is the moving average method. In this method, a set of y samples from timestep n-y to timestep n is considered to perform an arithmetic average of the samples themselves, and the average is used as pressure value at timestep n.

Thereafter, in the third step S3 it is checked whether an actual pressure value $P_n$ is larger than a preceding pressure value, or preceding smoothed pressure value, $P_{n-1}$. If this condition is met, a humidity index $EH_n$ is calculated in step S4 according to the following formula:

$$EH_n = EH_{n-1} + (P_n - P_{n-1})$$

If the actual pressure value $P_n$ is not larger than the preceding pressure value, or preceding smoothed pressure value, a humidity index $EH_n$ is calculated in an alternative step S4' according to the following formula:

$$EH_n = EH_{n-1} + (P_n - P_{n-1}) * K_{down} - EH_{n-1} * K_{relax}.$$

Note that the humidity index values are used in successive iteration steps, which is indicated by the arrows drawn from steps S4, S4' to step S1.

In the formulas, $K_{up}$ is a first weighting factor, $K_{down}$ is a second weighting factor, and $K_{relax}$ is a relaxation factor. The mentioned factors may be calibrated prior to each new application: calibration of the constants may be achieved by statistic correlation optimization, e.g. quadratic deviation minimization, between reference measurement values and calculated index values in different operative conditions. A calibration scenario may be performed to cover a whole range of temperature/humidity conditions. A typical range for $K_{up}$ and $K_{down}$ factors may be from 1 to 1000, and $K_{relax}$ may lie between 0.01 to 0.99, for a domestic oven.

Figure 3:
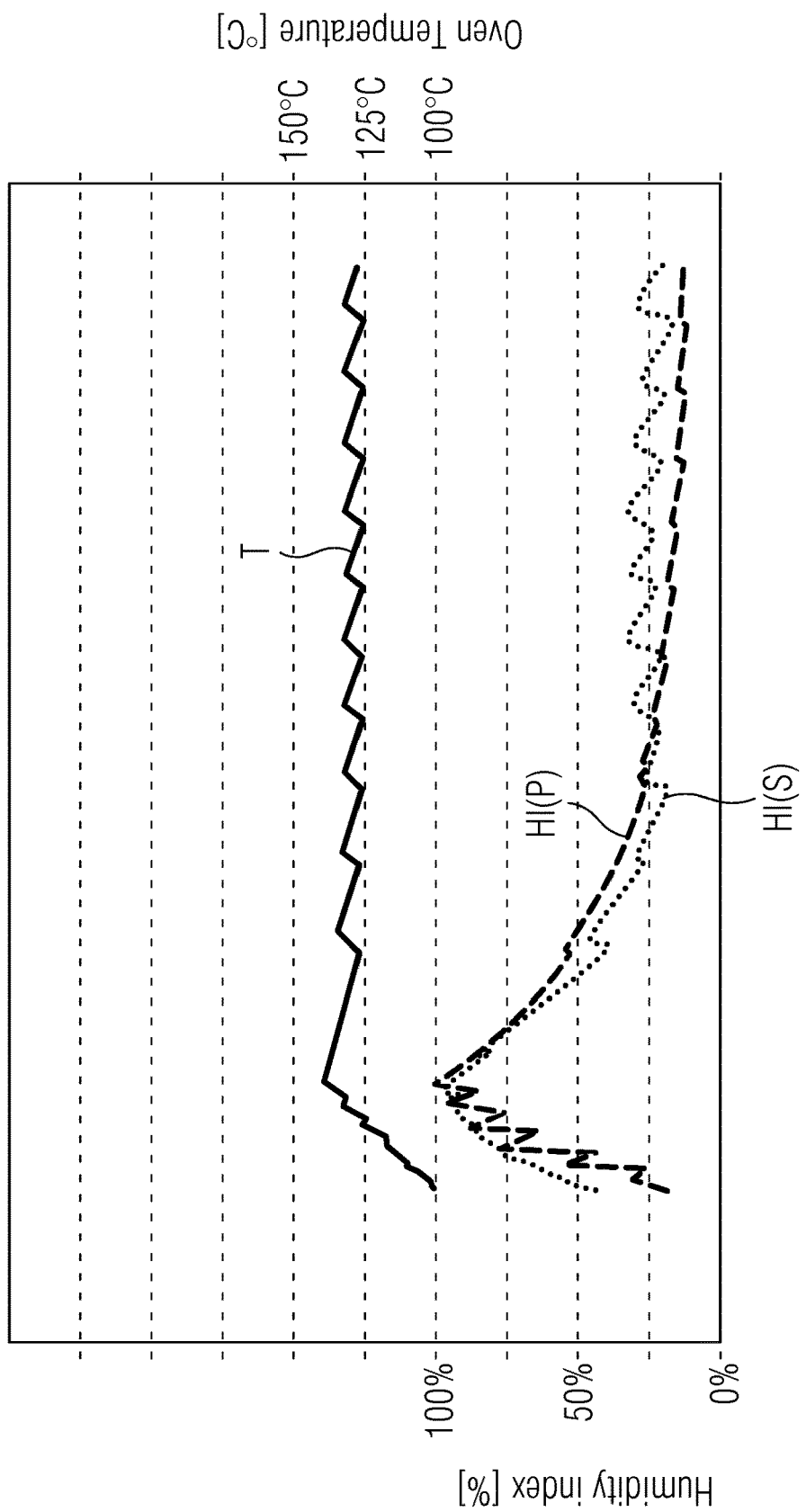
FIG. 3 shows an example of a correlation between a pressure sensor based humidity signal determined according to an embodiment of the invention and a humidity measurement obtained with a reference instrument.

Exemplary values for these factors, referred to the dataset shown in FIG. 3 are for example: $K_{up}=180$, $K_{down}=50$, and $K_{relax}=0.04$ Determining the humidity levels $EH_n$ as proposed in the steps given above can be conducted by the controller 5. The controller 5 can also be adapted to control steam generation, which in particular shall mean that the controller 5 may be adapted to activate or deactivate a steam generator in dependence of the humidity index values.

If the controller 5 determines that the humidity index value is indicative of a too high humidity level it may deactivate the steam generator.

Similarly, if the controller 5 determines that the humidity index value is indicative of a too low humidity level it may activate the steam generator.

In other situations, in which the controller 5 determines adequate humidity levels, it may leave the steam generator either in the on or off state.

The humidity level prevailing inside the steam cooking chamber 4 may be controlled by the controller 5 in accordance with recipes for food items placed within the steam cooking chamber. For this, the steam cooking appliance 1, in particular controller, may comprise a memory for storing respective recipe-related humidity levels.

FIG. 3 shows an example of a correlation or comparison between a pressure sensor based humidity signal determined according to an embodiment of the invention and a humidity measurement obtained with a reference instrument. Note that the reported graphic has been obtained for a domestic oven equipped by a steam generator.

In FIG. 3, the inner temperature T of the oven inner volume 7 is indicated with the upper dashed line. The oven temperature after an initial phase undergoes continuous fluctuations. The abscissa in FIG. 3 shall indicate the time course.

Note that the right hand side ordinate is related to the inner temperature, whereas the left hand side ordinate is related to the humidity index in percent.

The time course of the humidity index HI as determined or measured according to the invention is indicated as the dashed line HI(P) below the temperature curve T. This means, that HI(P) represents the time course of the humidity index as determined from pressure values according to the invention.

The time course of the humidity index HI as determined by a reference humidity sensor is indicated as the dotted line HI(S) below the temperature curve T. This means, that HI(S) represents the time course of the humidity index as determined with the reference sensor.

From the comparative graph in FIG. 3 showing the time course of the humidity index as determined according to the invention and the humidity index as determined with a reference sensor it can be seen, that the humidity index as determined according the invention is pretty close to the corresponding real values. This in particular shows that the proposed method is able to give consistent and robust values as compared to reference humidity measurement systems.

Based on the proposed method which can be implemented in a comparatively cost efficient way, the humidity levels prevailing within the steam cooking chamber 4 can be determined or estimated in a comparatively robust and reliable way. This in turn will positively affect steam cooking results.

LIST OF REFERENCE NUMERALS 1 steam cooking appliance
2 outer casing
3 user interface
4 steam cooking chamber
5 controller
6 pressure sensor
7 inner volume
8 communicating pipe
9 fan
S1-S3 first to third step
S4 fourth step
S4' alternative fourth step
T inner temperature
HI(P) humidity index determined from pressure values;
HI(S) humidity index determined from reference sensor;

The invention claimed is:

1. Method of operating a steam cooking process in a steam cooking cavity of a steam cooking appliance comprising:
    a. successively measuring, with a pressure sensor, static or quasi-static pressure values ($P_1, \ldots, P_n$) prevailing within the steam cooking cavity;
    b. successively calculating from the pressure values or smoothed pressure values ($P_1, \ldots, P_n$) via iterative numerical integration a humidity index value ($EH_1, \ldots, EH_n$), wherein the pressure values ($P_1, \ldots, P_n$) are measured at successive timepoints ($t_1, \ldots, t_n$) and an actual humidity index value $EH_n$ for a pressure value ($P_n$) is calculated from a preceding humidity index value ($EH_{n-1}$);
    c. setting and using the humidity index value ($EH_1, \ldots, EH_n$) as an actual measure for the humidity level; and
    d. activating or deactivating steam generation in the steam cooking appliance in dependence on the actual measure for the humidity level and at least one preset value of the humidity level.

2. Method according to claim 1, wherein the pressure sensor, via which the pressure values ($P_1, \ldots, P_n$) are measured, is arranged outside the cavity and is connected with the inner cavity volume via a communicating pipe.

3. Method according to claim 1, wherein the pressure sensor communicates with a zone within the cavity essentially unaffected by forced convection generated in the cavity by a fan.

4. Method according to claim 1, wherein the successive humidity index values ($EH_1, \ldots, EH_n$) are calculated in a weighted iterative numerical integration.

5. Method according to claim 1, wherein the humidity index values ($EH_1, \ldots, EH_n$) are calculated according to the following calculation rule:

a. $EH_n = EH_{n-1} + (P_n - P_{n-1}) * K_{up} - EH_{n-1} * K_{relax}$, if $P_n > P_{n-1}$ or b. $EH_n = EH_{n-1} + (P_n - P_{n-1}) * K_{down} - EH_{n-1} * K_{relax}$, if $P_n \leq P_{n-1}$;

wherein $EH_n$ and $EH_{n-1}$ are successive humidity index values; $P_n$ and $P_{n-1}$ are successive pressure values or successive smoothed pressure values, $K_{up}$ is a first weighting factor, $K_{down}$ is a second weighting factor, and $K_{relax}$ is a relaxation factor.

6. Method according to claim 5, wherein the factors $K_{up}$, $K_{down}$, and $K_{relax}$ are calibrated for each application.

7. Method according to claim 1, wherein the pressure sensor is adapted to measure pressures in the range from 0 to 30 Pa.

8. Method according to claim 1, wherein the pressure sensor is an absolute pressor sensor or a differential pressure sensor which is adapted to measure a difference pressure between inside of the cavity and outside of the cavity.

9. Method according to claim 1, wherein the actual humidity index value ($EH_n$) is further calculated from the pressure value ($P_n$) and a preceding pressure value ($P_{n-1}$) for the preceding humidity index value ($EH_{n-1}$).

10. Cooking appliance comprising a steam cooking functionality with a steam cooking cavity, a control unit, a pressure sensor and steam generation unit, respectively being coupled to the control unit, wherein the control unit is adapted to operate a steam cooking process according to the method of claim 1.

11. Cooking appliance according to claim 10, wherein the pressure sensor is mounted outside the cavity, and wherein the pressure sensor is connected to the inner volume of the cavity by a communicating pipe.

12. Cooking appliance according to claim 11, comprising a fan for forced ventilation or convection, wherein the communication pipe is connected to a section of the cavity volume which is essentially unaffected by the fan.

13. Cooking appliance according to claim 10, wherein the pressure sensor is an absolute pressure sensor or a differential pressure sensor and is adapted to calculate a difference pressure between the inside of the cavity and the outside of the cavity.

14. Cooking appliance according to claim 10, wherein the pressure sensor is adapted to sense pressures in the range between 0 and 100 Pa.

15. Cooking appliance according to claim 10, wherein the pressure sensor is adapted to sense pressures in the range between 0 Pa and 20 Pa.

\* \* \* \* \*